US006312210B1

(12) United States Patent
Lang

(10) Patent No.: US 6,312,210 B1
(45) Date of Patent: Nov. 6, 2001

(54) HAULING ACCESSORY FOR ALL TERRAIN VEHICLE (ATV)

(76) Inventor: Harold D. Lang, 101 Tanglewood Dr., Moulton, AL (US) 35650

( * ) Notice: Subject to any disclaimer, the term of this patent is extended or adjusted under 35 U.S.C. 154(b) by 0 days.

(21) Appl. No.: 09/491,007

(22) Filed: May 15, 2000

Related U.S. Application Data

(60) Provisional application No. 60/121,073, filed on Feb. 22, 1999.

(51) Int. Cl.[7] .................................................... B60P 1/10
(52) U.S. Cl. ....................... 414/540; 414/543; 414/462; 414/466; 224/570
(58) Field of Search ................................. 414/462, 466, 414/921, 541, 543, 540; 224/570

(56) References Cited

U.S. PATENT DOCUMENTS

| 5,011,361 | * | 4/1991 | Peterson | 414/462 |
| 5,217,149 | * | 6/1993 | Simonett | 224/40 |
| 5,567,107 | * | 10/1996 | Bruno et al. | 414/462 |
| 5,662,451 | * | 9/1997 | Muzzi et al. | 414/450 |
| 5,791,858 | * | 8/1998 | Sasser | 414/462 |
| 5,816,462 | * | 10/1998 | Brantley | 224/570 |
| 5,878,929 | * | 3/1999 | Leonard | 224/401 |
| 5,975,831 | * | 11/1999 | Martin | 414/543 |

* cited by examiner

Primary Examiner—Joseph A. Fischetti

(57) ABSTRACT

A hauling accessory for an all terrain vehicle (ATV) includes a jack with a stationary member and a telescoping member, the telescoping member being operable via a threaded screw rod. The stationary member includes mounting brackets with a plurality of apertures for receiving fasteners capable of securely fastening the stationary member to a luggage rack of the ATV such that the jack is oriented substantially perpendicular to the ground that supports the ATV. A lower rack including cargo support rods is affixed to a lower portion of the telescoping member of the jack. The cargo support rods are attached to telescoping arms whereby the width of the lower rack can be adjusted. An upper rack, which also includes cargo rods, is affixed to the stationary member of the jack adjacent the mounting bracket. In a preferred embodiment, the threaded screw rod is manually rotated via handle. In an alternative embodiment, the threaded screw rod is turned by a motor.

11 Claims, 3 Drawing Sheets

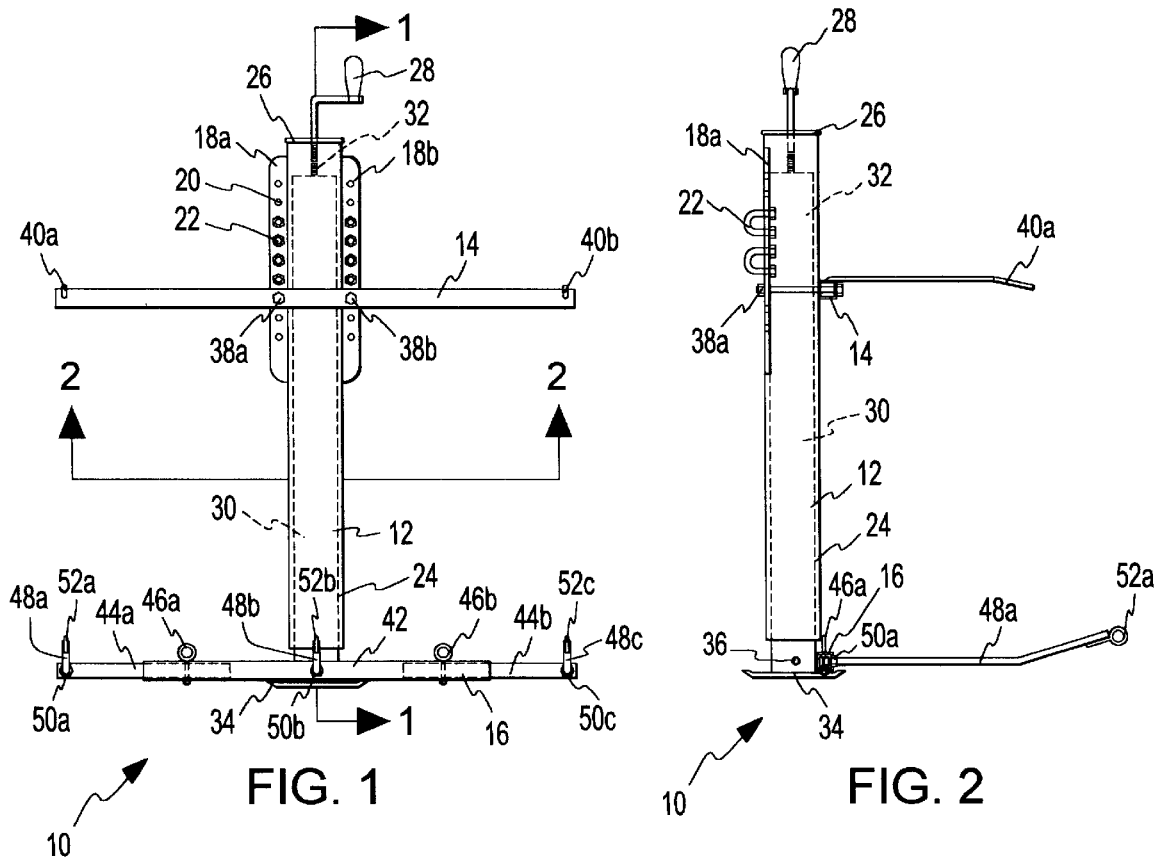
FIG. 1
FIG. 2
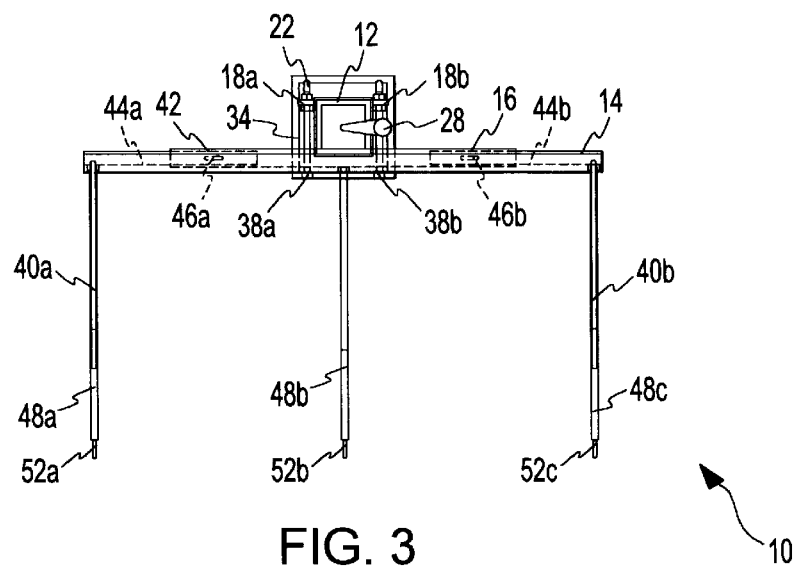
FIG. 3

HAULING ACCESSORY FOR ALL TERRAIN VEHICLE (ATV)

This application claims the benefit of U.S. Provisional Application No. 60/121,073, filed Feb. 22, 1999.

BACKGROUND

This version of the invention is concerned with the field of accessory devices for all terrain vehicles, frequently referred to as ATVs. More specifically, this version of the invention is concerned with accessory devices for ATVs that are releasably attached to the rear luggage rack of an ATV in order to provide additional carrying capacity and to lift and stow certain items that may possess weight in excess of that which can be readily lifted and secured by an ATV driver.

1. Prior Art

All terrain vehicles, commonly referred to as ATVs, have gained in popularity recently among outdoor recreational enthusiasts, such as hunters and campers, and also among property owners, ranchers and field hands who must travel off-road across terrain that is normally inaccessible to conventional vehicles to manage livestock, farm crops, and the like. As ATVs permit their riders to gain access to areas not available to conventional vehicles, ATVs are normally equipped with a variety of luggage racks, typically a front luggage rack attached to the ATV over the front tires and a rear luggage rack attached to the vehicle over the rear tires. These luggage racks permit hunters to carry firearms, bows, and miscellaneous hunting equipment with them to various hunting sites and to transport any game animals to various locations for weighing, cataloging, dressing, etc. Similarly, ATV luggage racks allow farmers and ranches to load and transport equipment, such as fence posts, rolls of wire, and bales of hay, to distant and widespread sites. As some of these items are relatively bulky and heavy, such as large game animals and rolls or wire, the user of an ATV finds that it is a difficult if not impossible task to lift, load, and secure such items onto a luggage rack, since such a rack is typically mounted to the ATV several feet above the ground surface. In these cases, the ATV user may attempt to lift a particular large and heavy items unaided and thus risk serious injury or aggravate an existing injury or medical condition and possibly damage the ATV if the ATV is used to brace or support the item during loading. Alternatively, the ATV user may decide to forego loading the item in question and retrieve it at a later time when help may be available in which case the item may perish as with a game animal or become lost or misplaced as with farm and ranch equipment.

What is needed then to overcome the aforementioned disadvantages of conventional ATV luggage racks is the provision of a carrying or hauling device that can be releasably attached to the rear luggage rack of an ATV. Such a carrying or hauling device would be constructed in part with means to receive, lift, and stow in a secure and stable manner a relatively heavy and bulky item when said item is being transported from a pickup location and to lower said item at a destination site for quick and unaided release from said device.

2. Discussion of the Prior Art

Numerous designs for carrying and hauling devices have been provided in the prior art. Even though these designs may be suitable for the specific individual purposes to which they address, they would not be suitable for the purposes of the present version of the invention. No prior effort, however, provides the benefits attendant with the present invention. As such, it may be appreciated that there is a continuing need for a new and improved hauling accessory for all terrain vehicles. In these respects, the present version of the invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein. The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

The present version of the invention, which will be described in greater detail hereinafter, relates to the field of accessory devices for all terrain vehicles, frequently referred to as ATVs. More specifically, this version of the invention is concerned with accessory devices for ATVs that are releasably attached to the rear luggage rack of an ATV in order to provide additional carrying capacity and to lift and stow certain items that may possess weight in excess of that which can be readily lifted and secured by an ATV driver. My version of the invention overcomes all of the shortcomings listed previously, in addition to novel aspects that will be described in detail hereinafter.

Described briefly, according to a typical embodiment, the invention presents a hauling accessory device for ATVs that is releasably attached to the rear luggage rack of an ATV. The device is comprised in the main of a telescoping jack, attachment brackets, and an upper rack and a lower rack. The upper and lower racks are attached to the telescoping jack in perpendicular arrangement so that when said device is attached to an ATV the upper and lower racks are disposed in parallel arrangement generally to the ground surface and the jack is thus disposed in perpendicular relation to the ground surface. The jack is constructed of a rectangular, stationary outer member that receives in sliding engagement a rectangular, telescoping inner member. When the inner member is fully retracted within the outer member, the lower end of the inner member does not fully retract therewith, said end attached to a base member that serves to make contact with the ground surface and stabilize the device when the inner member is fully extended. Extension and retraction of the telescoping member in relation to the stationary member is accomplished by rotation of a threaded rod member that is attached to the telescoping member in threaded engagement and to the stationary member in rotating arrangement. Upon rotation of a handle, the threaded rod turns and thus extends the inner member of the jack down towards the ground surface or up towards the stationary outer member. The various constituent parts of the hauling device can be manufactured of material that possesses characteristics appropriate for the intended duty, i.e. high strength, rigidity, light weight, and attractive appearance with aluminum, steel, and various composite materials offering the most feasible choices.

The attachment brackets, which are affixed to opposite sides of the stationary outer member of the jack, are formed with a series of apertures that receive threaded fasteners, typically U-type bolts, that are secured to the cross bars or rods of a rear luggage rack. If necessary, straight threaded fasteners are secured to the attachment brackets and an optional mounting plate so that the cross bars or rods of a rear luggage rack is disposed between the brackets and mounting plate.

The upper rack is a unitary component that is rectangular, elongate and tubular in shape and appearance. It is secured to the outer stationary member of the jack by two threaded fasteners, said fasteners disposed within apertures formed within the upper rack and within cooperating apertures formed within the attachment brackets. An elongate rod is affixed to each end of the upper rack in perpendicular relation thereto. The lower rack is an assembly component, comprised of a stationary, center member that is secured to the inner, telescoping member of the jack proximate to the base member, and two telescoping members, each telescoping member disposed in snug engagement within the cavity of the stationary center member. The telescoping members can be extended or retracted as needed to adjust the overall length of the lower rack with various positions secured by threaded fasteners that are fitted within cooperating apertures formed within the stationary center member and telescoping members. Three rods are attached to the lower rack with threaded fasteners in perpendicular relation thereto and in parallel arrangement to the rods of the upper rack. One rod is medially attached to the stationary center member, and one rod is attached to the exposed end of each of the telescoping members. The unattached end of each rod is fitted with a ring that can receive a rope, cord, or other similar binding tool. The rods provide a support system onto which items weighing up to 300 pounds are substantially positioned and secured for transport. If necessary, portions of the items can be secured to the upper rods and upper rack.

In an alternate version of the invention, an electric motor is attached to the top side of the jack, replacing the handle and function provided by said handle. In this version, the motor actuates the threaded rod that lowers and raises the inner telescoping member of the jack. Power is provided by an ATV battery and transported over connecting cables from the battery to the electric motor. Operation of the electric motor is controlled by a finger switch attached to the exterior of the motor housing.

My invention, therefore, resides not in any one of these features per se, but rather in the particular combination of all of them herein disclosed. It is distinguished from the prior art in this particular combination of all of its structures for the functions specified. In as much as the foregoing has outlined rather broadly the more pertinent and important features of the present invention in order that the detailed description of the invention that follows may be better understood so that the present contribution to the art can be more fully appreciated. Additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The foregoing is also neither intended to define the invention of the application nor is it intended to be limiting as to the scope of the invention in any way.

Accordingly, it is an object of my version of the invention to provide a low-cost, easy-to-manufacture, and easy-to-market hauling accessory for all terrain vehicles.

A further object of my version of the invention is to provide an easy-to-use and versatile hauling accessory for all terrain vehicles.

A significant object of the invention is to provide a hauling accessory for all terrain vehicles that augments the existing carrying capacity of an all terrain vehicle.

A final but very significant object of the invention is to provide a hauling accessory for all terrain vehicles that provides the means to receive, secure, and stow game animals and items of equipment that exceed the ability of an ATV user to lift, secure, or otherwise attach said animals and items to the conventional luggage racks of an all terrain vehicle.

For a better understanding of the invention, its operating advantages and the specific objects attained by its uses, reference should be made to the accompanying drawings and descriptive matter in which there are illustrated preferred embodiments of the invention. The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention illustrated by the accompanying drawings.

BRIEF DESCRIPTION OF THE DRAWINGS

The foregoing and other objects, features and advantages of the invention will become more fully understood from the following description of the preferred embodiments of the invention as illustrated in the accompanying drawings in which like reference characters refer to the same parts throughout different views. The drawings are not necessarily to scale, emphasis instead being placed upon illustrating the principles of the invention.

FIG. 1 is a front elevation view of a hauling accessory for all terrain vehicle in accordance with the present version of the invention.

FIG. 2 is a side elevation view of a hauling accessory device for all terrain vehicle taken along line 1—1 of FIG. 1.

FIG. 3 is a top plan view of a hauling accessory device for all terrain vehicle taken along line 2—2 of FIG. 1.

DRAWING REFERENCE NUMERALS

Figures 4, 5:
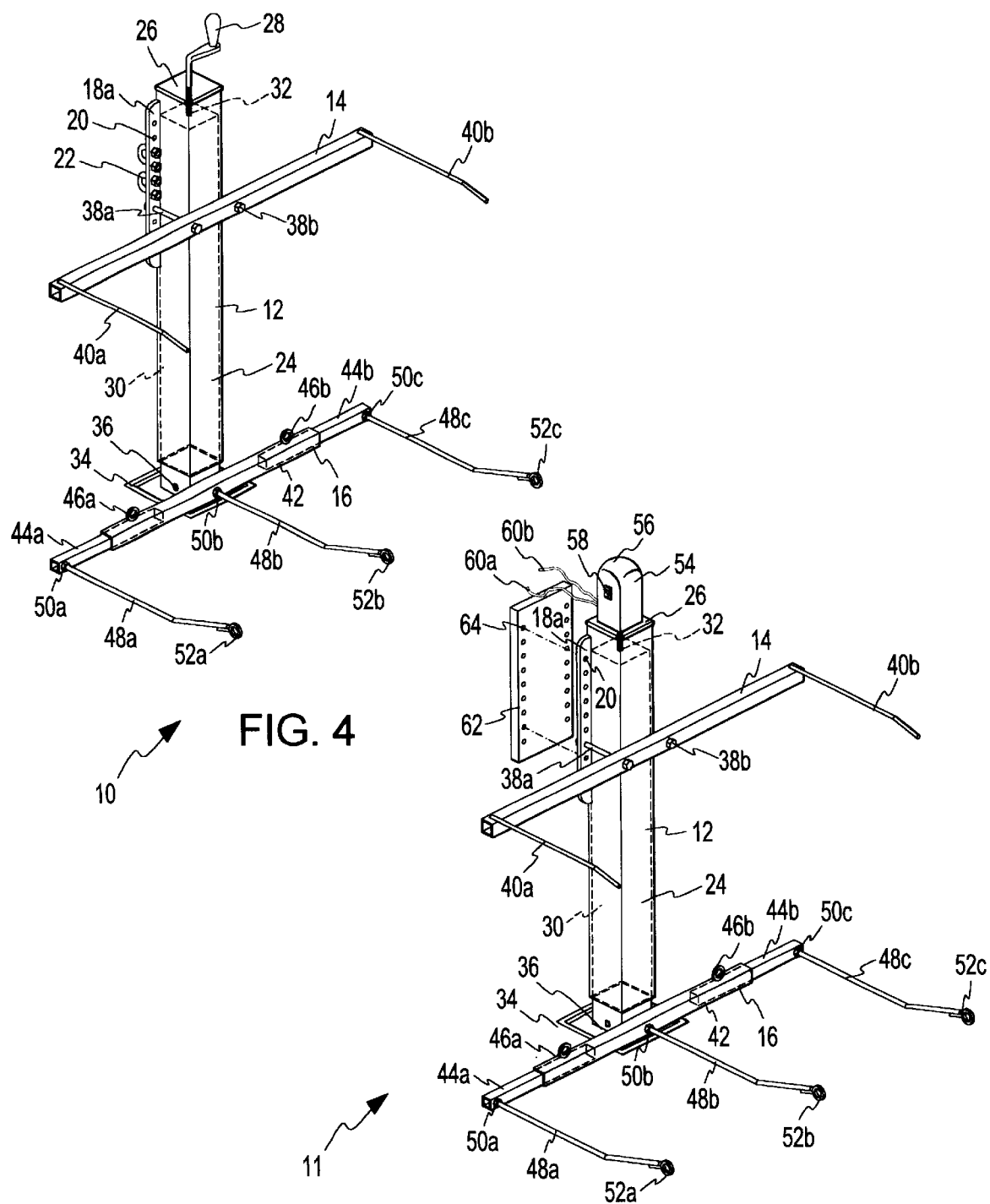
FIG. 4 is a perspective view of a hauling accessory for all terrain vehicle in accordance with the present version of the invention.
FIG. 5 is a perspective view of an alternate embodiment of a hauling accessory for all terrain vehicle in accordance with the present version of the invention.

10 Hauling Accessory for All Terrain Vehicle (ATV)
11 Alternate Embodiment, Hauling Accessory for All Terrain Vehicle (ATV)
12 Jack
14 Upper Rack
16 Lower Rack
18a, b Mounting Brackets
20 Aperture
22 Threaded Fastener
24 Stationary Member, Jack
26 Cap
28 Handle
30 Telescoping Member, Jack
32 Rod
34 Base
36 Pin
38a, b Fasteners
40a, b Rods
42 Stationary Member, Lower Rack
44a, b Telescoping Members, Lower Rack
46a, b Threaded Fasteners
48a, b, c Rods
50a, b, c Threaded Fasteners
52a, b, c Rings
54 Electric Motor
56 Housing
58 On/Off Switch
60a Positive Charge Power Line
60b Negative Charge Power Line
62 Mounting Plate
64 Aperture
66 All Terrain Vehicle (ATV)
68 Rear Luggage Rack
70a, b Horizontal Support Bars, Rear Luggage Rack

DESCRIPTION OF THE PREFERRED EMBODIMENTS

Description

Referring now to the drawings and, in particular, to FIG. 1, FIG. 2, FIG. 3, and FIG. 4 wherein there are illustrated a typical embodiment of the hauling accessory for all terrain vehicle (ATV) 10. The present version of the invention 10 consists of an assembly of various components that are joined together to furnish a device that can receive, lift, and stow items of equipment and game animals weighing up to 300 pounds for transport by an ATV. The device 10 is a unique combination of a carrying or luggage rack and a lifting and lowering device that allows large, bulky, and heavy items to be easily secured, stowed, and conveyed. The device 10 is comprised generally of a rectangular, elongate telescoping jack 12 and rectangular, elongate, tubular upper 14 and lower racks 16. A pair of narrow mounting brackets 18a, b are affixed in parallel arrangement to the exterior side walls of the jack 12 adjacent to the rear corners thereof. Each mounting bracket 18a, b is formed with a row of apertures 20 that receive various threaded fasteners 22 (U-type bolts or straight bolts) that releasably attach the device 10 to the rear luggage rack of an ATV in a manner that will be explained later in this description. As required, the threaded fasteners 22 can be inserted into the appropriate apertures 20 to accommodate rear ATV luggage racks of various shapes, configurations, and sizes. The jack 12 is comprised of a rectangular, elongate, outer stationary member 24, said member fitted at a top end with a square-shaped cap 26. The cap 26 is formed with an aperture that receives a handle 28 and threaded screw rod 32. The outer stationary member 24 receives in sliding engagement an inner, telescoping member 30 of similar size, shape, and proportion, except that the perimeter of the inside surface of the four side walls of the outer member 24 is approximate in dimension to the perimeter of the outside surface of the four side walls of the inner member 30. In this manner, the inner member 30 can extend from or retract within the outer member 24 in an unobstructed and stable manner. A portion of the inner member 30 remains extended for some distance from the outer member 24 even when said inner member 30 is fully retracted therewith. As such, a sufficient area of the front side of the inner member 30 remains available for attachment thereto by the lower rack 16. A square-shaped base 34 is attached to the exposed end of the inner member 30 by a pin 36 below the point of attachment of the lower rack 16. The threaded rod 32 is secured to the cap 26 in rotating engagement and to a top side wall of the inner member 30 in threaded engagement. In this manner, turning the handle 28 rotates the threaded rod 32, which in turn causes the inner member 30 to respond by extending from or retracting within the outer member 24. The length of extension and retraction is dependent upon the length of the threaded rod 32, which in this version of the invention extends substantially within the inner member 30 in order to allow the base 34 make firm contact with a ground surface when the device 10 is used with ATVs of various heights.

The upper rack 14 is attached in perpendicular arrangement to the outer member 30 of the jack 12 by means of threaded fasteners 38a, b that are received by apertures formed within the upper rack 14 and corresponding apertures 22 of the mounting brackets 18a, b. If necessary, the upper rack 14 can be lowered and raised in relation to the mounting brackets 18a, b by inserting the threaded fasteners 38a, b into the appropriate apertures 20 in order to secure cargo of differing sizes, shapes, and configurations. Narrow, elongate rods 40a, b are affixed to each end of the upper rack 14 in perpendicular relation thereof and to the jack 12. The unattached ends of the rods 40a, b terminate at X angle downwardly disposed towards the lower rack 16.

The lower rack 16 is an assembly of a central, stationary member 42 and two telescoping members 44a, b, each of which is maintained in sliding engagement within each end section of the stationary member 42. As such, each telescoping member 44a, b can extend from or retract within the stationary member 42 independent of the opposite telescoping member 44a, b as required to accommodate cargo items of various sizes, weights, bulk, and shapes. Threaded fasteners 46a, b (eye bolts) secured to the stationary member 42 and the telescoping members 44a, b maintain the telescoping members 44a, b in various phases of extension and retraction with adjustment thereof provided by apertures formed within the telescoping members 44a, b. In this manner, a telescoping member 44a, b can be extended or retracted as desired and secured in place by passing a threaded fastener through an aperture in the stationary member 42 and a corresponding aperture within a telescoping member 44a, b. A series of elongate rods 48a, b, c are attached to the lower rack 16 in perpendicular relation thereof and to the jack 12 by threaded fasteners 50, b, c, said fasteners attached to threaded ends of the rods 48a, b, c. Two elongate rods 48a, c are attached to each exposed end of the telescoping members 44a, b, respectively, and one elongate rod 48b is affixed to the stationary member 42. The unattached end of each elongate rod 48a, b, c terminates at X angle upwardly disposed towards the upper rack 14 and is fitted with an annulus or ring 52a, b, c of sufficient size to receive and maintain various lines, ropes, cords, or the like that can be used to fasten cargo to the device 10. Should the cargo be an item of large bulk or volume, said cargo can be further secured to the upper rack 14 and associated rods 40a, b.

The various components of the hauling device 10 are manufactured of material appropriate to the task in that high tensile strength, combination of flexibility and rigidity, and economy of acquisition and manufacturing are required with aluminum, carbon steel, various composite materials, and the like functioning as acceptable options.

Referring to FIG. 5, therein illustrated is an alternative embodiment 11 to this version of the invention. In this variation, the hauling device 11 is fitted with an electric motor 54 that is attached to the cap 26 of the jack 12. The electric motor is constructed in part with an outer housing 56, and on/off switch 58, and internal components (not shown) that are common in existing design. The driving mechanism of the motor is attached to the threaded rod 32 to allow the electric motor 54 accomplish the rotating function of the handle 28 of the previous embodiment. The electric motor 54 is connected to an ATV battery by positive 60a and negative charge 60b power lines.

A flat mounting plate 62, formed with two rows of apertures 64, is furnished to allow mounting of the device to the rear luggage rack of an ATV if the threaded fasteners 22 (U-type bolts) do not align with the rear luggage rack of an ATV. The apertures 64 of the mounting plate 62 are aligned with cooperating apertures 20 of the mounting brackets 18a, b. Straight threaded fasteners of the type 38a, b used to fasten the upper rack 14 to the mounting brackets 18a, b secure the mounting plate 62 to the mounting brackets 18a, b with the rear luggage rack of an ATV inserted therebetween. The mounting plate 62 can be used with either embodiment 10, 11 of the device if necessary.

Figure 6:
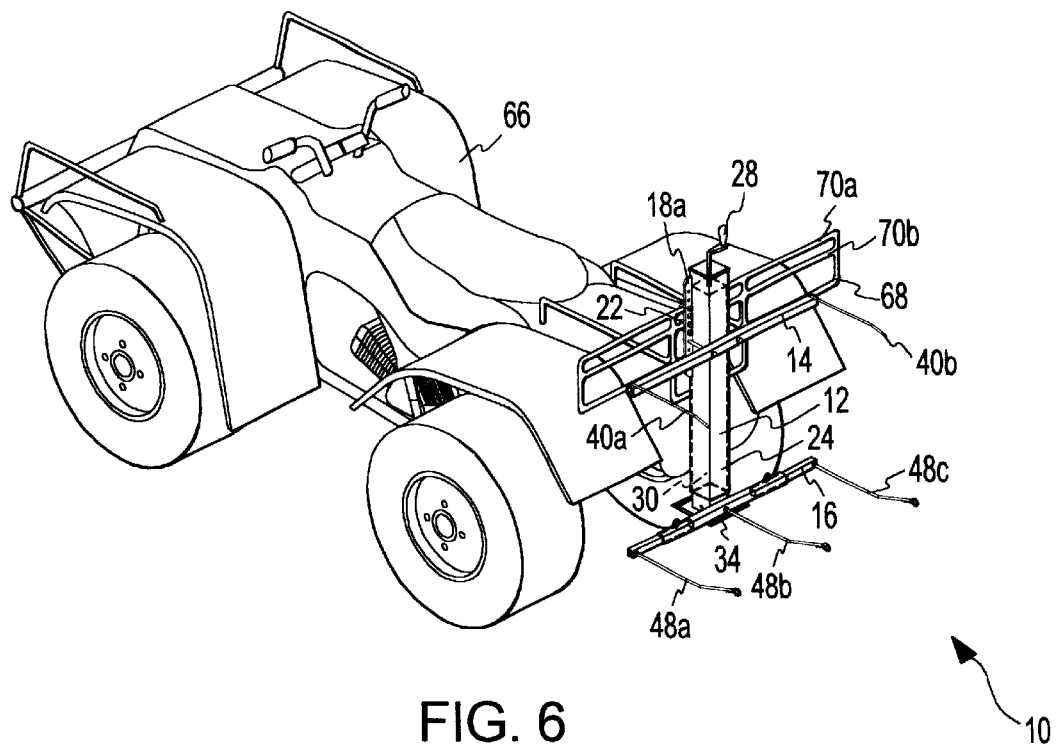
FIG. 6 is a perspective view of a hauling accessory for all terrain vehicle that is releasably attached to the rear luggage rack of an all terrain vehicle.
Figure 7:
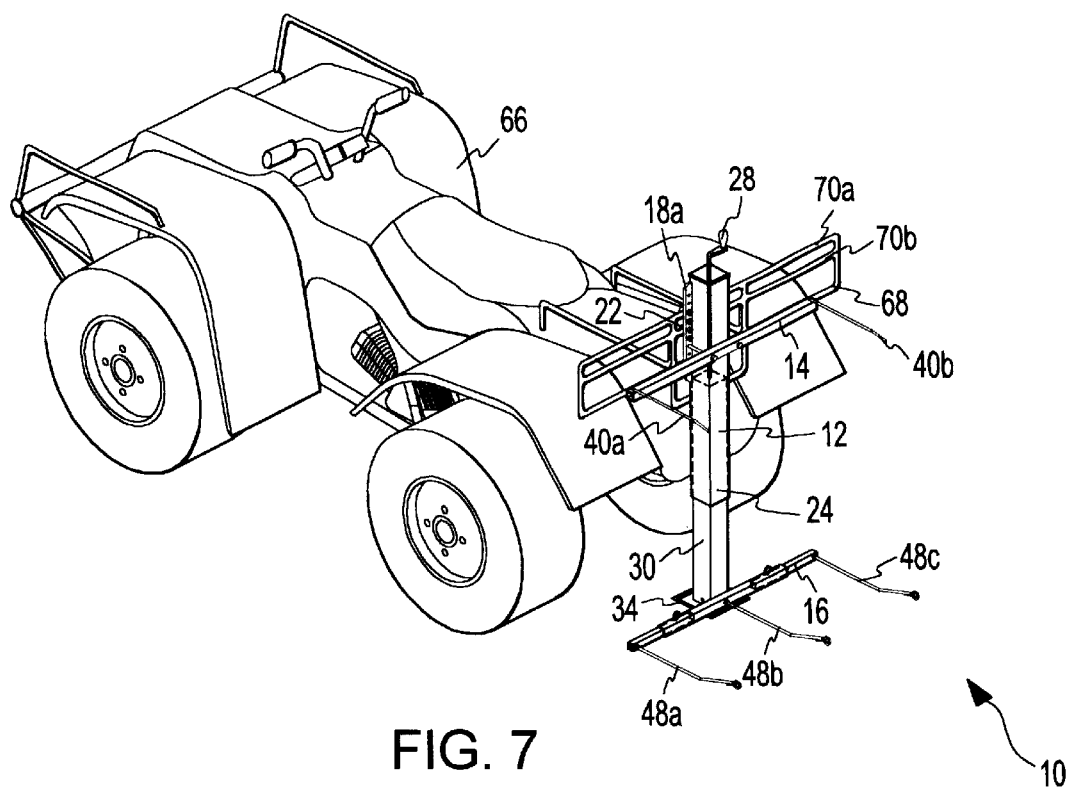
FIG. 7 is a perspective view of a hauling accessory for all terrain vehicle that is releasably attached to the rear luggage rack of an all terrain vehicle and illustrated with the jack extended downward to make contact with the ground surface.

As illustrated in FIG. 6, the first embodiment of the device 10 is attached to the rear luggage rack 68 of an all terrain vehicle 66. Threaded fasteners 22 (U-type bolts) are positioned over suitable horizontal support bars 70a, b of the rack 68 and secured to the mounting brackets 18a, b. In this manner, the device 10 is secured to the ATV in an unobtrusive manner by allowing adequate ground clearance that does not interfere with normal operation of the ATV 66. In FIG. 7, the device 10 is illustrated with the jack 12 positioned to receive a load of cargo. Rotation of the handle 28 actuates the threaded rod, which lowers the telescoping member 30 of the jack 12 until the base 34 makes contact with the ground surface. Once the cargo has been loaded onto the lower rack 16 and associated rods 48a, b, c and fastened as required to the device 10, the telescoping member 30 is raised to provide the ATV with adequate ground clearance.

While this version of the invention has been illustrated and described in detail in the drawings and foregoing description, the same is to be considered as illustrative and not restrictive in character, it being understood that only the preferred embodiments have been shown and described and that all changes and modifications that come within the spirit of the version of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Conclusion and Scope of Invention

From the foregoing, it will be understood by persons skilled in the art that an improved hauling accessory for all terrain vehicles has been provided. The invention is relatively simple and easy to manufacture, yet affords a variety of uses. While my description contains many specificities, these should not be construed as limitations on the scope of the version of the invention, but rather as an exemplification of the preferred embodiments thereof. The foregoing is considered as illustrative only of the principles of the invention. Further, since numerous modification and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A hauling accessory for an all terrain vehicle, comprising:

a jack (12) including a first stationary member (24) and a first telescoping member (30), the first telescoping member being coaxially and slidingly coupled to the first stationary member via a threaded screw, the first stationary member including a pair of mounting brackets disposed on either side of the first stationary member, the pair of mounting brackets including a plurality of apertures for receiving fasteners capable of securely fastening the first stationary member to a luggage rack of the all terrain vehicle such that a longitudinal axis of the jack is oriented substantially perpendicular to the ground that supports the all terrain vehicle;

a lower rack (16) including a second stationary member (42) that is stationary with respect to the first telescoping member, the second stationary member being affixed in a substantially perpendicular relationship to a lower end of the first telescoping member, the second stationary member having two ends accommodating, respectively, a second (44a) and a third (44b) telescoping member, the second and third telescoping members sharing the same operating axis, the second stationary member and the second and third telescoping members respectively having a lower rack rod extending therefrom in a direction substantially perpendicular to both the longitudinal axis of the jack and the second stationary member; and an upper rack (14) comprising a third stationary member affixed to the first stationary member via the pair of mounting brackets and being substantially parallel to the second stationary member, the third stationary member having two ends each having an upper rack rod extending therefrom in substantially the same direction as each of the lower rack rods, wherein a face of the pair of mounting brackets through which the apertures pass is in a first plane substantially parallel to a second plane that encompasses a longitudinal axis of the second and third stationary members.

2. The hauling accessory of claim 1, further comprising a handle for turning the threaded screw.

3. The hauling accessory of claim 1, wherein the first telescoping member comprises a base.

4. The hauling accessory of claim 1, wherein the first stationary member comprises a cap which rotatably engages the threaded screw.

5. The hauling accessory of claim 1, wherein free ends of the lower rack rods and upper rack rods are angled.

6. The hauling accessory of claim 1, further comprising a motor for rotating the threaded screw.

7. The hauling accessory of claim 1, wherein the threaded screw is turned such that the first telescoping member extends from and retracts into the first stationary member.

8. The hauling accessory of claim 1, wherein at least one free end of the lower rack rods includes a ring.

9. The hauling accessory claim 1, further comprising a mounting plate having apertures that are aligned with the apertures on the pair of mounting brackets.

10. The lifting device of claim 1, wherein the threaded screw is rotated by a handle.

11. The lifting device of claim 1, wherein the threaded screw is rotated by an electric motor.

* * * * *